Feb. 20, 1940. R. N. STODDARD ET AL Re. 21,369
WELDING APPARATUS
Original Filed April 12, 1934
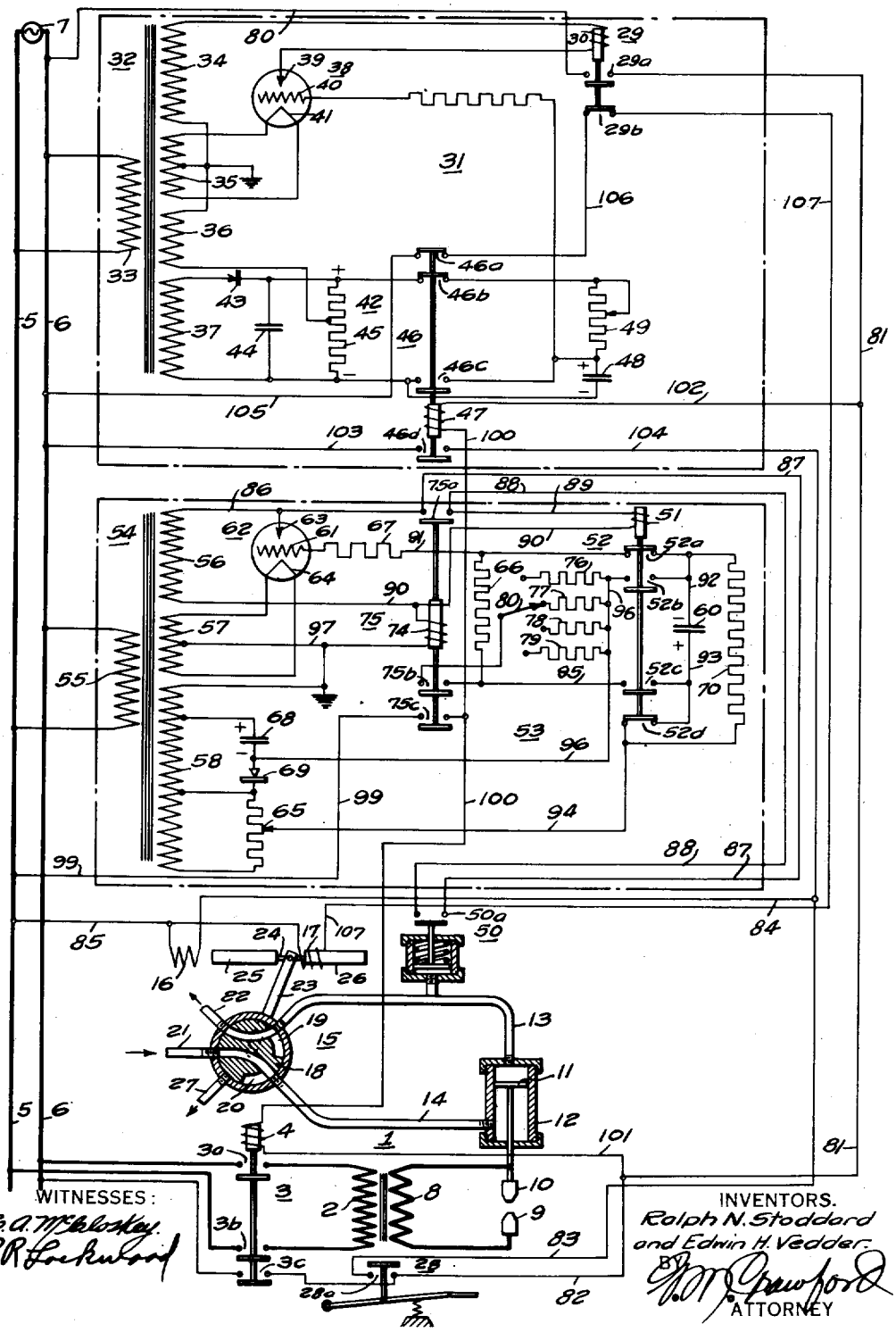
WITNESSES:
E. A. McCloskey
R. R. Lockwood
INVENTORS.
Ralph N. Stoddard
and Edwin H. Vedder.
BY
W. M. Crawford
ATTORNEY Reissued Feb. 20, 1940

Re. 21,369

UNITED STATES PATENT OFFICE 21,369

WELDING APPARATUS

Ralph N. Stoddard, East Orange, N. J., and Edwin H. Vedder, Forest Hills, Pa., assignors to Westinghouse Electric & Manufacturing Company, East Pittsburgh, Pa., a corporation of Pennsylvania Original No. 2,134,538, dated October 25, 1938, Serial No. 720,210, April 12, 1934. Application for reissue November 29, 1939, Serial No. 306,714

16 Claims. (Cl. 219—4)

Our invention relates, generally, to electrical control systems and it has particular relation to control systems for spot welders.

The object of our invention, generally stated, is to provide a control system for spot welding apparatus which shall be simple, efficient and accurate in operation, and which may be readily and economically manufactured and installed.

The principal object of our invention is to provide for controlling the relative movement of spot welding electrodes.

Another important object of our invention is to provide for applying welding current to the work when a predetermined pressure is applied thereto and for removing the pressure after welding current ceases to flow.

Another object of our invention is to provide for preventing the re-application of pressure to welding electrodes during a predetermined interval of time after pressure is removed therefrom.

A further object of our invention is to provide for applying pressure to work to be welded, applying welding current during a predetermined interval of time on application of a predetermined welding pressure, relieving the welding pressure on termination of flow of welding current, and preventing the re-application of welding pressure for a predetermined time interval. Other objects of our invention will, in part, be obvious and will, in part, appear hereinafter.

Our invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of our invention, reference may be had to the following detailed description, taken in connection with the accompanying drawing in which the single figure illustrates diagrammatically a welding system organized in accordance with our invention.

When it is desired to make spot welds at a high rate of speed, such as 90 to 100 spots per minute, it is desirable to automatically control both the movement of the welding electrodes into and out of engagement with the work, and also to automatically control the time of and duration of application of welding current to the work. In such a system, it is desirable to provide a single control for the operator which, as long as it is maintained in the operated position, causes the spot welding operations to be automatically repeated without necessitating any further control on the part of the operator with regard to either moving the welding electrodes or applying the welding current.

According to our invention, we have provided a pair of welding electrodes, one of which is fixed and the other movable as is the usual and customary practice. The movable electrode is urged into engagement with the work by fluid pressure means which may be initiated into operation by the closure of the control switch over a normally closed circuit. When a predetermined pressure is applied to the work, as measured by a pressure relay, welding current is applied to perform the welding operation for a predetermined length of time. At the same time, the normally closed circuit is opened but the circuit is maintained through an auxiliary circuit, so that the opening of the normally closed circuit at this time has no effect.

On termination of flow of welding current, the auxiliary circuit is opened, and the fluid pressure is relieved thereby permitting the movable electrode to move out of engagement with the work. After the expiration of a predetermined time interval the normally closed circuit which was opened on flow of welding current is again closed, and the foregoing cycle of operations may be successively repeated as long as the control switch is maintained in the operated condition.

Referring now particularly to the diagram, the reference character 1 illustrates, generally, a transformer having a primary winding 2 connected by means of a main switch 3, having an operating winding 4, to power conductors 5 and 6 which may be energized by a suitable alternating-current source 7, that may be a 60-cycle generator. The transformer 1 is also provided with a secondary winding 8, the terminals of which are connected to a fixed electrode 9 and a movable electrode 10, between which the work to be welded may be positioned.

The movable electrode 10 is connected to a piston 11 which is slidably positioned within a cylinder 12. Inlet pipes 13 and 14 are connected to the cylinder 12, as illustrated, in order to apply pressure to the upper and lower sides, respectively, of the piston 11.

The piston 11 is moved both downwardly and upwardly under the influence of fluid pressure the admission of which is controlled by means of a control valve, shown generally at 15, having an operating winding 16 for operating the valve 15 to one position to apply pressure to the upper side of the piston 11 and another operating winding 17 for operating the valve 15 to another position to apply pressure to the underside of the piston 11. The control valve 15 comprises a rotatable drum 18 provided with passageways 19 and 20 which are arranged, in the position illustrated, to connect the pipe 14 to an intake pipe 21 which may be connected to any suitable source of fluid pressure, such as air, oil or the like and to connect the pipe 13, by means of passageway 19, to an exhaust pipe 22. It will be understood that pressure will then be applied to the underside of the piston 11 to maintain the movable electrode 10 out of engagement with the work and that pressure is relieved from the upper side of the piston 11 due to the connection of the pipe 13 to the exhaust pipe 22.

An arm 23 is secured to the rotatable drum 18, of the valve 15, and is pivotally attached to a rod 24 connecting armatures 25 and 26 which are disposed to be attracted by the operating windings 16 and 17, respectively. When the operating winding 16 is energized, the armature 25 is attracted and the drum 18 is rotated to connect the pipe 13 to the intake pipe 21 by means of the passageway 19 while the pipe 14 is connected, by means of passageway 20 to another exhaust pipe 27. Pressure will thereupon be applied to the upper side of the piston 11 and will be relieved from the underside thereof. The movable electrode 10 will then be forced into engagement with the work positioned between it and the fixed electrode 9.

While the foregoing fluid pressure system has been described as being employed for operating the movable electrode 10 into and out of engagement with the work to be welded, it will be readily understood that any other suitable system may be provided for effecting a corresponding movement of the electrode 10, and that the fluid pressure system shown and described herein is used merely for illustrative purposes.

In order to initiate the cycle of operation of the welding system, a control switch, shown generally at 28, is provided. The control switch 28 may be of the foot-operated type in order to permit the operator to use his hands for moving the work to be welded between the welding electrodes 9 and 10 after the completion of each welding operation.

The control switch 28 is disposed to energize the operating winding 16 of the control valve 15 over a circuit which is normally completed by means of contact members 29*a* of a timer relay, shown generally at 29, and having an operating winding 30. The function of the timer relay 29 is to prevent the re-application of pressure to the work positioned between the welding electrodes 9 and 10 for a predetermined time interval after it has been removed therefrom.

The timer relay 29 forms a part of an electrode control circuit, shown generally at 31. The electrode control circuit 31 may be energized by means of a transformer, shown generally at 32, having a primary winding 33 connected to the conductors 5 and 6 and a plurality of secondary windings 34, 35, 36 and 37. A space discharge device, shown generally at 38, and having an anode 39, a grid 40 and a hot cathode 41 is provided for energizing the operating winding 30 of the timer relay 29. The space discharge device 38 may be of the type which becomes conducting on the application of a predetermined potential to the grid 40 above a characteristic negative potential.

The space discharge device 38 is normally maintained in the conducting condition by means of a positive potential applied thereto from the grid supply circuit shown generally at 42. As illustrated, the grid supply circuit 42 is connected for energization across the secondary winding 37 of the transformer 32 and a rectifier 43, which may be of the copper-oxide type, is provided for supplying direct current to the circuit 42. A capacitor 44 is provided for smoothing out the ripples in the rectified direct current, while a voltage dividing resistor 45 is provided for completing the circuit to the grid 40 through the secondary winding 36 of the transformer 32 to provide the desired grid voltage characteristic. A grid control relay, shown generally at 46, having an operating winding 47, is arranged, when deenergized, to connect a capacitor 48 through an adjustable potentiometer 49 by means of contact members 46*b* to the circuit 42, so that a positive potential will be applied to the grid 40 to normally maintain the space discharge device 38 conducting and the winding 30 of timer relay 29 energized.

On energization of grid control relay 46, contact members 46*b* are opened, thereby removing the positive potential from the grid 40 and applying thereto, on closure of contact members 46*c*, a negative potential from the circuit 42, to cause the space discharge device 38 to become nonconducting, and thereby to effect the deenergization of winding 30 of the timer relay 29 The energization of grid control relay 46 also causes contact members 46*d* to be closed to shunt the contact members 29*a* of timer relay 29 and contact members 28*a* of the foot control switch 28, thereby providing an auxiliary holding circuit for the operating winding 16 of the control valve 15. Contact members 46*a* are also opened to prevent the energization of operating winding 17 of the control valve 15 on the deenergization of timer relay 29.

After the operating winding 16 of the control valve 15 has been energized, fluid pressure will be applied to the cylinder 12, which pressure may be measured by means of a pressure relay shown generally at 50, that may be adjusted to close contact members 50*a* on the application of a predetermined pressure. The closure of contact members 50*a* completes a circuit for energizing a winding 51 of a grid control relay, shown generally at 52, forming a part of a current control circuit, shown generally at 53. The current control circuit 53 may be energized by means of a transformer, shown generally at 54, having a primary winding 55 connected to be energized from the conductors 5 and 6, and secondary windings 56, 57 and 58.

The energization of grid control relay 52 serves to connect a capacitor 60 to a grid 61 of a space discharge device, shown generally at 62, having an anode 63 and a hot cathode 64. The space discharge device 62 may be similar to the space discharge device 38, previously described. The capacitor 60 is normally charged with the polarities indicated when the grid control relay 52 is deenergized because of the asymmetric conducting characteristics of the space discharge device 62. The potential to which the capacitor 60 is charged may be regulated by means of an adjustable resistor 65, which is connected, for energization, as illustrated, across a portion of the secondary winding 58.

On energization of the grid control relay 52 the capacitor 60 is connected through resistors 66 and 67 to the grit 61 and in series circuit relation with an oppositely charged capacitor 68 to the cathode 64. The capacitor 68 is normally charged to the potential indicated by means of a rectifier 69, which may be of the copper-oxide type, the capacitor 68 and rectifier 69 being connected for energization across another portion of the secondary winding 58. The capacitor 68, charged with the polarities indicated, is provided in order to ensure that the potential applied to the grid 61 when the capacitor 60 is discharged will be well below the critical potential of the space discharge device 62, in order to ensure that it will be rendered non-conducting after the expiration of a predetermined time interval. A resistor 70 is arranged to be connected across the capacitor 60 when the grid control relay 52 is deenergized in order to provide for dissipating the charge applied to the capacitor 60 when the current control circuit 53 is deenergized.

When the space discharge device 62 is rendered conducting, a circuit is completed for energizing winding 74 of an auxiliary switch, shown generally at 75. The operation of auxiliary switch 75 closes contact members 75*a* which serve to shunt the contact members 50*a* of the pressure relay 50. In addition, contact members 75*b* are closed to connect one of the discharge resistors 76, 77, 78 or 79, depending upon the position of the arm 80, in shunt circuit relation with the capacitor 60 to effect its discharge. The resistors 76, 77, 78 and 79 are provided having different resistances so that the time required for discharging the capacitor 60 may be varied to correspondingly change the time during which the space discharge device 62 is maintained in the conducting state.

The operation of auxiliary switch 75 also closes contact members 75*c* which complete a circuit for energizing the operating winding 4 of the main switch 3 to connect, at contact members 3*a* and 3*b*, the primary winding 2 to the power conductors 5 and 6. Welding current is thereupon applied to the welding electrodes 9 and 10 and the welding operation is performed. The closure of contact members 75*c* also completes a circuit for energizing the operating winding 47 of the grid control relay 46.

After the expiration of the time required to effect the discharge of the capacitor 60 to reduce the potential applied to the grid 61 of the space discharge device 62 below the critical potential, the space discharge device 62 is rendered non-conducting, thereby deenergizing operating winding 74 of the auxiliary switch 75. Contact members 75*c* are opened, and operating windings 4 and 47 of the main switch 3 and grid control relay 46 are correspondingly deenergized. The main switch 3 is then opened and the flow of welding current ceases.

The deenergization of grid control relay 46 opens, at contact members 46*d*, the circuit to the operating winding 16 of the control valve 15 and completes, at contact members 46*a*, a circuit for energizing operating winding 17 to operate the control valve 15 back to the position shown in the drawing. Pressure is thereupon applied to the underside of the piston 11 and relieved from the upper side thereof. Although the control switch 28 may still be maintained in the operated position, the circuit to the operating winding 16 will not be completed due to the fact that the operating winding 30 of timer relay 29 is deenergized and contact members 29*a* are opened. After the expiration of a predetermined interval, which may be adjusted by means of the adjustable resistor 49, the capacitor 48 will be sufficiently positively charged to apply the proper energizing potential to the grid 40 of the space discharge device 38, which potential will be above the critical potential thereof and the space discharge device 38 will then become conducting. The operating winding 30 of the timer relay 29 will again be energized, contact members 29*a* will be closed, and the foregoing cycle of operation may be repeated.

The circuits for effecting the foregoing cycle of operations will now be traced in order to set forth in more detail the functioning of our novel control system for spot welders. It will be assumed as set forth hereinbefore that the conductors 5 and 6 are properly energized and that a source of fluid pressure is provided for operating the piston 11 in the cylinder 12.

On operation of the control switch 28 a circuit is completed from energized conductor 6 through conductor 80, contact members 29*a*, which are closed when timer relay 29 is energized, conductors 81 and 82, contact members 28*a* of the control switch 28, conductors 83 and 84, operating winding 16 of the control valve 15 and conductor 85 to the energized conductor 5.

On the application of a predetermined pressure to the air cylinder 12 contact members 50*a* of pressure relay 50 are closed to complete a circuit for energizing the winding 51 of grid control relay 52. This circuit may be traced from secondary winding 56 of the transformer 54 through conductors 86 and 87, contact members 50*a*, conductors 88 and 89, operating winding 51 of the grid control relay 52 and conductor 90 back to the secondary winding 56.

As set forth hereinbefore, the capacitor 60 is charged with the polarities indicated when the grid control relay 52 is in the deenergized position. The charging circuit may be traced from the grid 61 through resistor 67, conductor 91, contact members 52*a*, conductor 92, capacitor 60, conductor 93, contact members 52*d*, conductor 94, adjustable resistor 65 and secondary winding 58, to the mid-point of the secondary winding 57 which is connected to the cathode 64.

The energization of grid control relay 52 reverses the connections of the capacitor 60 to the grid 61 in order to render the space discharge device 62 conducting. This circuit may be traced from the grid 61 through resistor 67, conductor 91, resistor 66, conductor 95, contact members 52*c*, conductor 93, capacitor 60, conductor 92, contact members 52*b*, conductor 96, capacitor 68 to the secondary winding 58 and to the midpoint of the secondary winding 57.

The application of the energizing potential to the grid 61 causes the space discharge device 62 to become conducting, as set forth hereinbefore, and operating winding 74 of the auxiliary switch 75 is energized. This circuit may be traced from the secondary winding 56 through the space discharge device 62, to the secondary winding 57, conductor 97, operating winding 74 and conductor 90 back to the secondary winding 56.

The energization of auxiliary switch 75 completes, by the closure of contact members 75*b*, an obvious circuit for discharging the capacitor 60 through one of the resistors 76, 77, 78 or 79.

The energization of auxiliary switch 75 also completes a circuit for energizing the operating winding 4 of the main switch 3 which may be traced from the energized conductor 5 through conductor 99, contact members 75*c*, conductor 100, winding 4 of the main switch 3, conductors 101 and 81, contact members 29a, and conductor 80 to the energized conductor 6. Main switch 3 on closing completes, at contact members 3c, a circuit for shunting contact members 29a of the timer relay 29 so that, on deenergization of the timer relay 29, the main switch 3 will be maintained in the operated position under the control of auxiliary switch 75.

The energization of auxiliary switch 75 also completes a circuit for energizing grid control relay 46 which may be traced from the energized conductor 5 through conductor 99, contact members 75c, conductor 100, winding 47 of relay 49, conductors 102 and 81, contact members 29a and conductor 80 to the energized conductor 6.

The energization of grid control relay 46 completes, at contact members 46d, an auxiliary holding circuit for the operating winding 16 of the control valve 15 which may be traced from energized conductor 6 through conductor 103, contact members 46d, conductors 104 and 84, winding 16 and conductor 85 to the energized conductor 5. As long as the grid control relay 46 remains energized the cycle of operation will not be affected by the opening of the control switch 28.

The energization of grid control relay 46 opens, at contact members 46b, the charging circuit for capacitor 48 and at contact members 46c, completes a circuit for short circuiting the capacitor 48 and also for applying a negative potential to the grid 40 over an obvious circuit. Timer relay 29 which had previously been maintained in the energized position by the space discharge device 38 over an obvious circuit, is then deenergized when the space discharge device 38 is no longer maintained in the conducting state.

The circuit for energizing operating winding 17 of the control valve 15 is completed on deenergization of grid control relay 46. This circuit may be traced from the energized conductor 6, through conductor 105, contact members 46a, conductor 106, contact members 29b of timer relay 29 which is deenergized, conductor 107, winding 17 of the control valve 15, and conductor 85 to the energized conductor 5.

Since certain further changes may be made in the above construction, and different embodiments of the invention may be made without departing from the scope thereof, it is intended that all matter contained in the above description or shown in the accompanying drawing shall be interpreted as illustrative and not in a limiting sense.

We claim as our invention:

1. Spot welding apparatus comprising, in combination, a pair of relatively movable welding electrodes for engaging work means including manually operable switching means and pressure fluid supply means controlled by said switching means for moving said electrodes into engagement with the work under pressure on the operation of said switching means, means, operable by the pressure of said fluid, for applying welding current to said electrodes for a predetermined time interval after a predetermined pressure is applied to the work, and means for preventing the relaxation of the pressure applied to said work or the reapplication of pressure to said work for a predetermined time interval after welding current is applied which is equal in length at least to said predetermined time interval during which welding current is applied regardless of the number and character of operations of said switching means after the said operation.

2. Spot welding apparatus comprising, in combination, a pair of relatively movable welding electrodes for engaging work, manually operable switching means, pressure fluid supply means controlled by said switching means, means for moving said electrodes into engagement with the work under fluid pressure on the operation of said switching means, means for applying welding current to said electrodes for a predetermined time interval, and means for preventing the relaxation of the pressure applied to said work or the reapplication of pressure to said work for a predetermined time interval after welding current is applied which is equal in length at least to said predetermined time interval during which welding current is applied regardless of the number and character of operations of said switching means after the said operation.

3. Spot welding apparatus comprising, in combination, a pair of relatively movable welding electrodes for engaging work, pressure fluid supply means, means actuable by the pressure of said fluid for moving said electrodes into engagement with the work under fluid pressure, manually operable means for initiating the functioning of said fluid pressure actuable means, means for applying welding current to the work for a predetermined time interval, and means for preventing the reapplication of pressure to the work for a predetermined time interval after the expiration of said first-mentioned time interval regardless of the number and character of operations of said manual means after an initiating operation.

4. Spot welding apparatus comprising, in combination, a pair of relatively movable welding electrodes for engaging work, pressure fluid supply means, means actuable by the pressure of said fluid for moving said electrodes into engagement with the work under fluid pressure, manually operable means for initiating the functioning of said actuable means, means operable by the pressure of said fluid for applying welding current to said welding electrodes and work for a predetermined time interval after a predetermined pressure is applied to the work, and means for preventing the reapplication of pressure to the work for a predetermined time interval after the expiration of said first-mentioned time interval regardless of the number and character of operations of said manual means after the initiating operation.

5. Spot welding apparatus comprising, in combination, fixed and movable welding electrodes disposed to engage opposite sides of work to be welded, manually operable switching means, pressure fluid supply means controlled by said switching means, means actuable by the pressure of said fluid for causing the movable electrode to engage the work under pressure on the operation of said switching means, means for applying welding current to said electrodes and through the work for a predetermined time interval, means for actuating said fluid pressure actuable means to relieve the pressure applied to said electrodes after the expiration of said time interval, and means for thereafter preventing the reapplication of pressure to said electrodes for a predetermined time interval regardless of the number and character of operations of said switching means after the said operation.

6. Spot welding apparatus comprising, in combination, fixed and movable welding electrodes disposed to engage opposite sides of work to be welded, manually operable switching means, pressure fluid supply means controlled by said switching means, means actuable by the pressure of said fluid for causing the movable electrode to engage the work under pressure after said switching means has been operated, means operable by the pressure of said fluid for applying welding current to said electrodes and through the work for a predetermined time interval after a predetermined pressure is applied to the work, means for actuating said fluid pressure actuable means to relieve the pressure applied to said electrodes after the expiration of said time interval, and means for thereafter preventing the reapplication of pressure to said electrodes for a predetermined time interval regardless of the number and character of the operation of said switching means after the said operation.

7. Spot welding apparatus comprising, in combination, a pair of relatively movable welding electrodes disposed to oppositely engage work to be welded, manually operable switching means, fluid pressure means operable to cause the electrodes to engage the work when said switching means is operated, circuit means for applying welding current to said welding electrodes and through the work for a predetermined time interval, pressure responsive means for initiating the functioning of said circuit means on application of a predetermined pressure to the work, means for relieving the pressure applied by said pressure means to the work after the expiration of said time interval, and means for thereafter preventing the reapplication of pressure to the work for a predetermined time interval regardless of the number and character of operations of said switching means after the said operation.

8. Spot welding apparatus comprising, in combination, fixed and movable welding electrodes disposed to oppositely engage work to be welded, fluid pressure means operatively connected to the movable electrode for causing the electrodes to engage the work, manually operable means for initiating the functioning of said pressure means, a current source, circuit means for connecting the welding electrodes to the current source for a predetermined time interval, pressure responsive means for initiating the functioning of said circuit means on application of a predetermined pressure to the work, means for relieving the pressure applied by said pressure means to the work after the expiration of said time interval, and means for thereafter preventing the reapplication of pressure to the work for a predetermined time interval regardless of the number and character of operations of said manual means after the initiating operation.

9. A system for controlling current flow to and movement of spot welding electrodes comprising, in combination, means for applying working pressure to the electrodes and to work positioned therebetween, a normally closed energizing circuit for said means, means for applying current to said electrodes and work, means responsive to the operation of said last-named means for opening the normally closed energizing circuit for said first-named means, and means for maintaining said circuit in the open condition for a predetermined time interval to prevent reapplication of pressure to the electrodes during said interval.

10. A system for controlling current flow to and movement of spot welding electrodes comprising, in combination, a normally closed circuit, means for applying working pressure to the electrodes and work positioned therebetween, means for energizing said pressure applying means over said normally closed circuit, means for applying welding current to said electrodes and work for a predetermined time interval after a predetermined pressure is applied to the work, means for opening said closed circuit at the beginning of said time interval, means for relieving the pressure applied to the work after the expiration of said time interval, and means for preventing the reclosure of said circuit for a predetermined time interval to prevent reapplication of pressure to the electrodes and work until the expiration thereof.

11. A system for controlling current flow to and movement of spot welding electrodes comprising, in combination, a normally closed circuit, means for applying working pressure to the electrodes and work positioned therebetween, manually operable switch means for energizing said pressure applying means over said normally closed circuit, means for applying welding current to said electrodes and work for a predetermined time interval after a predetermined pressure is applied to the work, means operable simultaneously with the application of welding current for shunting said closed circuit and manual switch means during the application of welding current and for opening said closed circuit, and means for preventing the reclosure of said circuit for a predetermined time interval after the termination of flow of welding current to prevent reapplication of pressure to the electrodes and work until the expiration thereof.

12. A system for controlling current flow to and movement of spot welding electrodes comprising, in combination, a timer relay having an operating winding and contact members disposed to be closed on energization of said winding, a space discharge device having an anode, a cathode and a grid and connected to a source of alternating current, said operating winding being connected in the anode circuit of said device, circuit means for applying an energizing potential to said grid to render said device conducting, thereby energizing said winding and closing said contact members, fluid pressure means for operating said electrodes into engagement with work to be welded, a control valve for connecting said pressure means to a fluid pressure supply, a winding connected in series circuit relation with said contact members for operating said valve to the intake position, a current source, manually-operable switch means disposed to connect said last-named winding to said current source, a main switch disposed to connect the welding electrodes to said current source, means for effecting the closure of said main switch for a predetermined time interval, pressure measuring means disposed to initiate the operation of said last-named means on application of predetermined pressure to the work, and means effective simultaneously with the closure of said main switch for shunting said contact members and manual switch means and for rendering said space discharge device non-conducting, thereby deenergizing said timer relay, said last-named means being effective at the expiration of said time interval to deenergize the operating winding of said valve to relieve the pressure applied to the work and to render said space discharge device conducting at the expiration of a predetermined time interval to energize said timer relay and permit the recurrence of the operating cycle.

13. In a controller for an electric circuit, in combination, a power operated switch for said circuit, manual means to control said switch, and a power operated device to control said switch, said manual means being operable to effect operation of said switch to complete said circuit but only when said power operated device occupies a given position, said power operated device being rendered operative each time said circuit is completed to move from such given position to another position to effect release of said switch and comprising means of the time delay type, to delay its aforementioned functioning pending lapse of a given time, the said time delay means operating to delay said functioning pending lapse of said given time regardless of the number and character of the operations of said manual means after it has been once operated to effect operation of said switch, and said power operated device further having means to render it operable repeatedly to effect repeated cycles of operation of said switch if said manual means when operated is retained in operated position.

14. Apparatus for timing the periods during which a work-circuit is closed and open, comprising: on-timing means for controlling the duration of the closed period; and off-timing means for controlling the duration of the open period between successive closed periods; one of said timing means including means responsive to a predetermined electro-motive-force for causing termination of its respective period and for effecting initial operation of the other of said timing means, and manually operable means for initiating the operation of said one timing means, said timing means operating for their characteristic time periods after an initiating operation regardless of the number and character of operations of said manually operable means after the said initiating operation.

15. Apparatus for timing the periods during which a work-circuit is closed and open, comprising: on-timing means for controlling the duration of the closed period; and off-timing means for controlling the duration of the open period between successive closed periods; one of said timing means including means responsive to a predetermined electro-motive-force for causing termination of its respective period and for effecting initial operation of the other of said timing means, and also including means for altering the value of the electro-motive-force applied to said one timing means to said predetermined electro-motive-force required to effect operation of said responsive means, manually operable means for initiating the operation of said one timing means, and means for assuring that said timing means function for their characteristic periods independently of the number and character of operations of said manually operable means after an initiating operation.

16. Apparatus for timing the periods during which a work-circuit is closed and open, comprising: on-timing means for controlling the duration of the closed period; and off-timing means for controlling the duration of the open period between successive closed periods; the duration of one of said periods being dependent upon the magnitude of the voltage applied to one of said timing means, said one period being greater for small voltages applied to said one timing means and less for large voltages; said one timing means including means for causing termination of said one period and for effecting initial operation of the other of said timing means, manually operable means for effecting initiation of said one timing means, and means for assuring that said timing means function for their characteristic periods independently of the number and character of operations of said manually operable means after an initiating operation.

RALPH N. STODDARD.
EDWIN H. VEDDER.